Patented Dec. 5, 1950

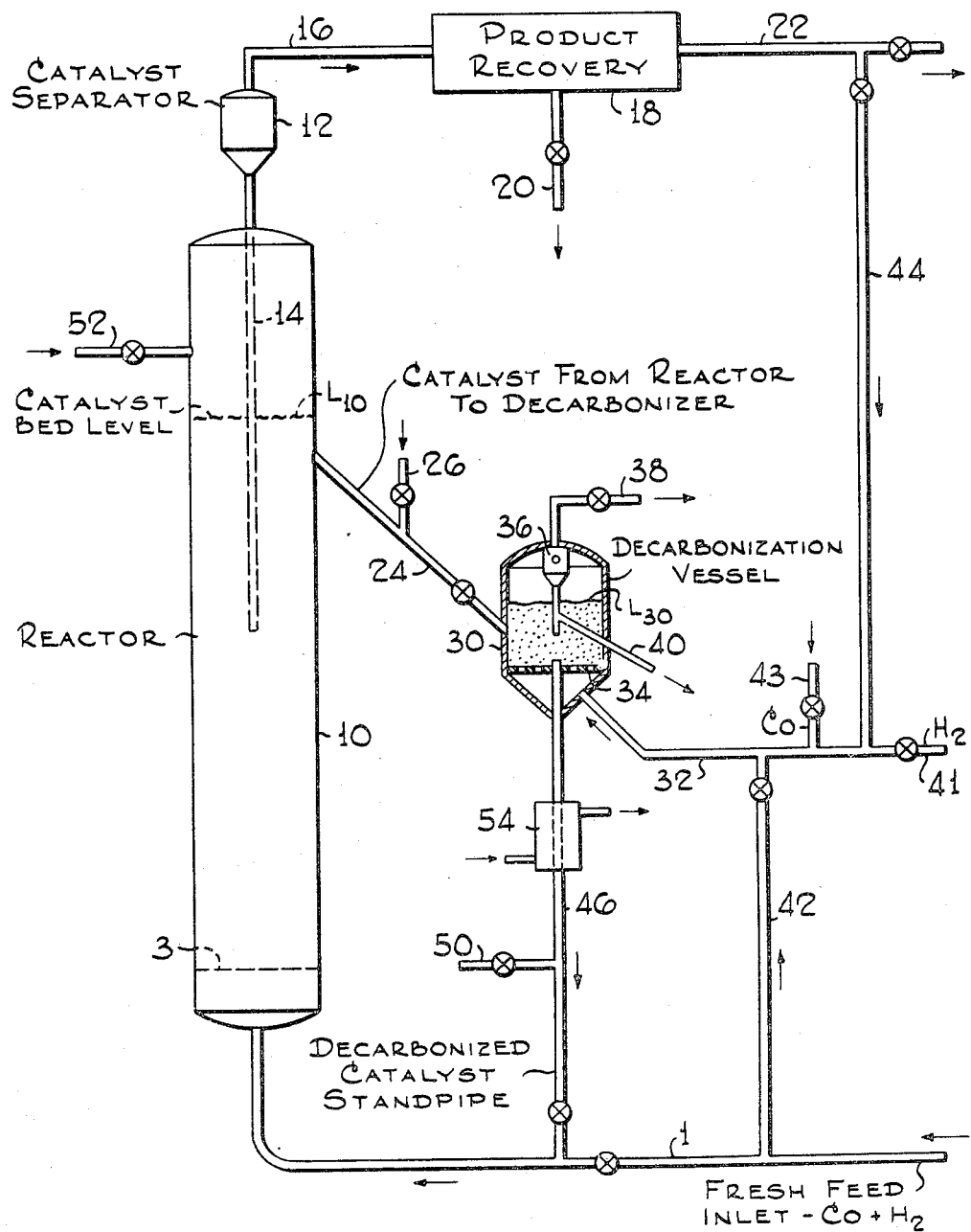

2,533,072

UNITED STATES PATENT OFFICE 2,533,072

HYDROCARBON SYNTHESIS

Alexis Voorhies, Jr., Baton Rouge, La., assignor to Standard Oil Development Company, a corporation of Delaware Application June 5, 1947, Serial No. 752,801

4 Claims. (Cl. 260—449.6)

This invention relates to the catalytic conversion of carbon oxides with hydrogen to form valuable synthetic products. The invention is more particularly concerned with an improved method of employing and reconditioning finely divided catalysts having a high activity and selectivity for the formation of normally liquid hydrocarbons in the catalytic conversion of carbon monoxide with hydrogen employing the so-called fluid solids technique.

The synthetic production of liquid hydrocarbons from gas mixtures containing various proportions of carbon monoxide and hydrogen is already known and numerous catalysts, usually containing an iron group metal, have been described which are specifically active in promoting the desired reactions at certain preferred operating conditions. For example, cobalt supported on an inert carrier is used when relatively low pressures (atmospheric to about 5 atmospheres) and low temperatures (about 375°–425° F.) are applied in the manufacture of a substantially saturated hydrocarbon product while at the higher temperatures (about 450°–750° F.) and higher pressures (about 5–25 atmospheres and higher) required for the production of unsaturated and branched-chain products of high antiknock value, iron-type catalysts are more suitable.

In both cases, the reaction is strongly exothermic and the utility of the catalyst declines steadily in the course of the reaction chiefly due to the deposition of non-volatile conversion products such as carbon, paraffin wax, and the like, on the catalyst.

The extremely exothermic character and high temperature sensitivity of the synthesis reaction and the relatively rapid catalyst deactivation have led, in recent years, to the application of the so-called fluid solids technique wherein the synthesis gas is contacted with a turbulent bed of finely divided catalyst fluidized by the gaseous reactants and products. This technique permits continuous catalyst replacement and greatly improved heat dissipation and temperature control.

However, the adaptation of the hydrocarbon synthesis to the fluid solids technique has encountered serious difficulties particularly with respect to catalyst deposits and their detrimental effects on the fluidization characteristics and mechanical strength of the catalyst.

As stated above, one of the most important modifications of the hydrocarbon synthesis requires the use of iron-type catalysts. These catalysts are the outstanding representatives of a group of catalysts which combine a high synthesizing activity and selectivity toward normally liquid products with a strong tendency to carbonize during the synthesis reaction, that is, to form fixed carbon or coke-like catalyst deposits which can not be readily removed by conventional methods of synthesis catalyst regeneration such as extraction, reduction, steam-treating or the like.

These carbon deposits, when allowed to accumulate, weaken the catalyst structure, probably due to carbide formation which leads to rapid catalyst disintegration particularly in fluid operation. The reduction of the true density of the catalyst resulting from its high content of low-density carbon coupled with the rapid disintegration of the catalyst particles causes the fluidized catalyst bed to expand, thereby reducing its concentration of catalyst and ultimately resulting in the loss of the catalyst bed because it becomes impossible to hold the catalyst in a dense phase at otherwise similar fluidization conditions. With these changes in fluid bed characteristics, the heat transfer from and throughout the bed decreases markedly favoring further carbonization and accelerating the deterioration of the fluidity characteristics of the bed.

Prior to the present invention, it has been suggested to reduce the carbon content of catalysts of this type by withdrawing the carbonized material from the synthesis reactor and subjecting it to the action of hydrogen at temperatures of about 900°–1000° F. which lie substantially above the conventional synthesis temperatures of about 550°–700° F. This procedure involves a destructive hydrogenation of the carbonaceous catalyst deposits to form volatile products which are carried off during the treatment. Simultaneously the hydrogen treatment reactivates the catalyst itself. However, heat must be supplied to the catalyst to be decarbonized to raise it from the temperature level of the synthesis reaction to the higher temperature level of efficient decarbonization with hydrogen. It has been suggested to accomplish this either by an indirect heat supply through the walls of the catalyst transfer line or of the decarbonization reactor or by generating heat within the decarbonization reactor in the form of exothermic heat of a limited combustion reaction with a free oxygen-containing gas. The first method considerably increases equipment and operating cost of the process while the second method is difficult to control if undesirable catalyst oxidation is to be avoided.

The present invention overcomes the aforementioned difficulties and affords various additional advantages. These advantages, the nature of the invention and the manner in which it is carried out will be fully understood from the following description thereof read with reference to the accompanying drawing.

In accordance with the present invention, catalyst carbonized in the synthesis of hydrocarbons from CO and $H_2$ is withdrawn from the synthesis reactor substantially at synthesis temperature and decarbonized by contact with hydrogen at a higher decarbonization temperature in a separate decarbonization stage, the heat required to establish the higher decarbonization temperature being supplied by the addition to the decarbonization stage of carbon monoxide in amounts just sufficient to generate the necessary heat by a limited synthesis reaction with hydrogen present in the decarbonization zone. In this manner any desired quantity of heat may be generated and the temperature may be easily and quickly adjusted within a few degrees F. in a decarbonization stage substantially self-supporting with respect to heat requirements, simply by controlling the carbon monoxide supply, without the necessity of additional heating equipment and without the danger of undesirable oxidation reactions.

While carbon monoxide of any origin may be used in controlled amounts, it is preferred to add suitable proportions of the synthesis feed gas to the hydrogen supplied to the decarbonization stage. In this manner the production of substantially pure carbon monoxide, which is relatively complicated and expensive, becomes superfluous and merely the production of substantially pure hydrogen is required which may be accomplished by various inexpensive conventional procedures, such as the well known iron-steam process, the conversion of water gas by CO-removal, etc.

In many cases, the separate manufacture of substantially pure hydrogen may be dispensed with and the hydrogen contained in the tail gas from the synthesis stage may be used for the purpose of the invention. This simplified procedure may be used whenever the synthesis reaction is conducted at relatively high CO-conversion levels of say 98% or higher yielding a tail gas of relatively high hydrogen and low CO concentrations. It may be desirable to free the tail gas of $CO_2$ and gaseous hydrocarbons, particularly olefinic gases such as ethylene and propylene, prior to the passage of the tail gas to the decarbonization stage in order to avoid undesirable side reaction such as oxidation and/or carbon formation by cracking.

The wholly or partly decarbonized catalyst may be returned to the synthesis stage. The process may be operated intermittently or continuously with respect to the cycle of synthesis and decarbonization stages. Particularly when operating in a continuous manner the carbon concentration in the synthesis reactor may be maintained substantially constant at a desirable low level.

The amounts of hydrogen and CO required for efficient decarbonization in accordanc with the present invention may vary within wide limits depending mainly on the amounts of catalyst to be decarbonized, the degree of decarbonization desired, the temperature differential between the synthesis reactor and the decarbonization reactor and the heat insulation of the decarbonization reactor and the catalyst transfer line from the synthesis reactor to the decarbonization reactor. In general, it may be stated that about 10 to 50 normal cu. ft. of $H_2$ and about 1 to 5 normal cu. ft. of CO are usually sufficient to remove about 0.05 to 0.20 lb. of carbon per lb. of catalyst at synthesis temperatures of about 550°–750° F. and decarbonization temperatures of about 900°–1200° F. assuming conventional heat insulation.

The process of the invention affords greatest advantages when applied to synthesis processes using moving and particularly fluidized, catalyst masses which may be passed continuously from a synthesis reactor to a separate decarbonization reactor and vice versa, and which have an extreme tendency to disintegrate as a result of carbonization. However, in its broadest aspects, the invention is also applicable to some advantage to fixed bed operation wherein the catalyst may be subjected in the same vessel to alternating synthesis and decarbonization cycles, as will be readily understood by those skilled in the art.

Having set forth its objects and general nature, the invention will be best understood from the more detailed description hereinafter in which reference will be made to the accompanying drawing which illustrates schematically a system suitable for carrying out a preferred embodiment of the invention.

Referring now in detail to the drawing the apparatus illustrated therein essentially consists of a synthesis reactor 10 and decarbonization vessel 30 whose functions and cooperation will be forthwith explained with reference to the decarbonization of a carbonizing iron catalyst. It should be understood however that other strongly carbonizing catalysts may be used in a substantially analogous manner.

In operation, synthesis reactor 10 contains finely divided iron catalyst such as reduced pyrites ash promoted with about 1.5% of potassium carbonate. However other conventional iron catalysts of satisfactory activity and selectivity toward liquid products may be used. The catalyst may have a particle size of about 100–400 mesh or finer, preferably mostly about 200 to 400 mesh.

A synthesis gas mixture from any suitable source, having a ratio of $H_2$:CO which may vary between the approximate limits of 0.5–3:1, is fed at the synthesis pressure of about 5–50, preferably about 10–30 atmospheres through line 1 to enter reactor 10 through a distributing device such as grid 3 at a superficial velocity controlled within the limits of 0.3–10 ft. per second preferably 0.5–3 ft. per second so as to maintain the catalyst in the form of a dense, highly turbulent, fluidized mass having a well defined upper level $L_{10}$. The position of level $L_{10}$ is a function essentially of the amount and specific gravity of the catalyst and the velocity and viscosity of the synthesis gas. The fluidized catalyst in the catalyst zone below level $L_{10}$ may have a density of about 15 to 150 lbs. per cu. ft. while the catalyst density above level $L_{10}$ may be as low as 0.05 lb. per cu. ft. Any catalyst particles remaining suspended in the gaseous and vaporous reaction products and unreacted synthesis gas withdrawn upwardly from level $L_{10}$ may be separated in a conventional type gas-solids separator, such as a filter or a centrifugal or electrical gas-solids separator 12 and returned through a pipe 14 to the catalyst mass below level $L_{10}$.

As a result of the excellent heat transfer characteristics of the fluidized catalyst mass in reactor 10, the reaction temperature may be easily kept constant within a few degress F. at the desired temperature level which for catalysts of the type here involved lies between the approximate limits of 500° and 800° F., preferably between about 550° and 700° F. Surplus heat of the exothermic reaction may be withdrawn and heat required for starting up the process may be supplied by any conventional heat transfer means (not shown).

Reaction gases and vapors substantially free of entrained catalyst fines are withdrawn from separator 12 through line 16 and passed to a conventional product recovery system 18, which may include $CO_2$-removal and hydrocarbon-gas absorption facilities. Liquid product is recovered through line 20. Tail gas leaves system 18 through line 22 to be either discarded or used in the process as will be explained hereinafter.

In order to prevent excessive carbonization and resulting catalyst disintegration within reactor 10 and to permit the maintenance of the favorable fluidization and reaction conditions specified above, the present invention provides for a catalyst treatment as follows. When the carbonization of the catalyst has reached the highest degree that may be tolerated without excessive disintegration of the catalyst particles, say a carbon content of about 10 to 30% by weight, fluidized catalyst is withdrawn from reactor 10 at a point above grid 3 through line 24 and passed by gravity to decarbonization vessel 30. Line 24 may be aerated through one or more taps 26 to facilitate the flow of fluidized catalyst through pipe 24.

A mixture of hydrogen and a minor proportion of carbon monoxide is supplied to the bottom portion of vessel 30 from a gas feed line 32. The gas mixture in line 32 may be preheated by any conventional means, preferably in heat exchange with hot synthesis reaction vapors and gases and/or hot off-gases from vessel 30, to any desired temperature within the approximate range of 600°–1200° F. The absolute and relative amounts of hydrogen and carbon monoxide in this gas mixture are so controlled that a substantial proportion of carbon is removed from the catalyst during its residence within vessel 30 and that a sufficient reaction between carbon monoxide and hydrogen takes place within vessel 30 to supply the heat required by the decarbonization. If it is desired to reduce the carbon content of the catalyst from about 20% to about 5%, vessel 30 may be designed for a catalyst residence time of about 5 to 100 minutes, and 10 to 50 normal cu. ft. of hydrogen, and about 1 to 5 normal cu. ft. of carbon monoxide, preheated to a temperature of about 600° F. may be supplied per pound of catalyst from line 32 to vessel 30 to maintain a reaction temperature of about 1000–1100° F.

While vessel 30 is preferably substantially smaller than reactor 10 it may be operated in a manner generally similar to that described in connection with reactor 10. That is, the gas mixture from line 32 may enter the bottom portion of vessel 30 through a grid 34 at a superficial velocity of about 0.3–10 ft. per second to convert the catalyst within vessel 30 into a dense, highly turbulent fluidized mass similar to that in reactor 10, forming a well defined upper level $L_{30}$. Gaseous decarbonization products and unreacted hydrogen containing small amounts of suspended catalyst fines are withdrawn overhead through a conventional gas-solids separator 36 to be discarded through line 38, preferably after heat exchange with decarbonization feed gas. Catalyst fines in separator 36 may be returned to the catalyst mass below level $L_{30}$ or withdrawn from the system through line 40.

As previously indicated, the hydrogen and/or CO supplied to line 32 may be manufactured separately in substantially pure form, and fed to the system through lines 41 and 43, respectively. In accordance with the preferred embodiment of the invention, however, carbon monoxide is supplied in the form of synthesis gas from line 1 through line 42 in proportions suitable to establish the desired carbon monoxide concentration within vessel 30. If synthesis reactor 10 is operated at a carbon monoxide conversion level high enough to produce a synthesis tail gas substantially free of carbon monoxide such tail gas, preferably after carbon dioxide and olefinic gas removal, in product recovery system 18, may be branched off line 22 and passed via lines 44 and 32 to vessel 30 to supply the hydrogen required therein. Synthesis reaction conditions suitable for such high carbon monoxide conversion include temperatures in the region from 600° to 750° F., pressures of 250 to 750 p. s. i. g., feed rates from 5 to 100 cubic feet of fresh $H_2+CO$ per hour per pound of catalyst, and an iron-type catalyst, usually containing an added promoter in proportions of 0.3 to 5% of catalyst.

Returning now to vessel 30, decarbonized catalyst is withdrawn from vessel 30 preferably under the pseudo-hydrostatic pressure of the catalyst mass within vessel 30, through pipe 46 which may have the form of a conventional standpipe aerated through 1 or more taps 50, by a suitable fluidizing gas such as synthesis gas, spent decarbonization gas, etc. The same type of fluidizing gas may be used to aerate pipe 24 through tap 26. Decarbonized catalyst from standpipe 46 is preferably passed into synthesis gas feed line 1 wherein it is suspended to form a dilute solids-in-gas suspension. This dilute suspension passes under the combined pressures of standpipe 46 and synthesis gas line 1 to the bottom portion of reactor 10 as described above. It should be understood that the pressure on the bottom of the standpipe 46 must be at least as high as the pressure in feed gas line 1 in order to accomplish this solids flow.

When operating in the manner described above the carbon concentration of the catalyst in reactor 10 may be maintained at low levels of about 5–20%, which are not conducive to excessive catalyst disintegration, by continuously circulating about 100 to 5000 lbs. of catalyst between reactor 10 and vessel 30 per million normal cu. ft. of synthesis gas contacted with a catalyst in reactor 10.

The system illustrated by the drawing permits various modifications. Instead of circulating carbonized catalyst from reactor 10 to vessel 30 by gravity flow, the catalyst may be withdrawn under the pseudo-hydrostatic pressure of the catalyst mass in reactor 10 suspended in the gases flowing through line 32 and supplied as a dilute solids-in-gas suspension to the bottom portion of vessel 30, substantially as described in connection with standpipe 46 and gas feed line 1. In this case vessel 30 may be so arranged as to permit recirculation of decarbonized catalyst to reactor 10 by gravity flow substantially as outlined in connection with pipe 24. Other conventional means for conveying fluidized solids such as mechanical conveyors, pressurized feed hoppers, etc., may be used in place of solid circulating lines 24 and 46. Catalyst losses in the form of fines discarded through line 40 may be made up by continuously or intermittently supplying fresh catalyst to reactor 10 through line 52. If desired, the catalyst in the standpipe 46 may be cooled by means of a cooler 54 to any temperature which will not interfere with the maintenance of the proper reaction temperature in reactor 10. These and other changes may be made in the details disclosed in the foregoing specification without departure from the invention or sacrificing the advantages thereof.

The process of the present invention is not to be limited by any theory or mode of operation but only by the following claims:

I claim:

1. In the production of synthetic products including normally liquid hydrocarbons and oxygenated compounds by the conversion of a synthesis gas containing carbon monoxide and hydrogen in synthesis proportions at synthesis conditions of temperature and pressure in the presence of a synthesis catalyst having a strong carbonization tendency at the synthesis conditions, the steps of contacting said synthesis gas in a synthesis zone with a dense, turbulent, fluidized mass of finely divided iron base catalyst at a synthesis temperature of about 600° to 750° F., a pressure of about 250 to 750 p. s. i. g., and a fresh synthesis gas feed rate of about 5 to 100 cu. ft. per hour per pound of catalyst so as to convert the carbon monoxide content of said synthesis gas to at least 98%, withdrawing a gasiform mixture of reaction products and unconverted hydrogen, separating said mixture into desired products and a tail gas rich in hydrogen but substantially free of carbon monoxide, passing finely divided carbonized catalyst containing fixed carbon from said synthesis zone to a decarbonization zone, maintaining said withdrawn catalyst in said decarbonization zone in the form of a dense, turbulent, fluidized mass of solids, contacting at least a substantial portion of said tail gas with said catalyst in said decarbonization zone at a decarbonization temperature of about 1000° to 1200° F. in proportions and for a time sufficient substantially to decarbonize said carbonized catalyst by removing fixed carbon, adding synthesis gas to said decarbonization zone in amounts sufficient but not exceeding that required to generate the heat required for maintaining said decarbonization temperature by an exothermic reaction of carbon monoxide with hydrogen within said decarbonization zone, and passing finely divided decarbonized catalyst from said decarbonization zone to said synthesis zone.

2. The process of claim 1 in which said catalyst is circulated from said conversion zone to said decarbonization zone substantially at said synthesis temperature.

3. The process of claim 1 in which catalyst circulation between said conversion and decarbonization zones is so controlled that the carbon content of the catalyst in said conversion zone is maintained below a level conducive to substantial catalyst disintegration.

4. The process of claim 3 in which said carbon content is below about 20% by weight of said catalyst.

ALEXIS VOORHIES, Jr.

REFERENCES CITED

The following references are of record in the file of this patent:

UNITED STATES PATENTS

| Number | Name | Date |
|---|---|---|
| 2,251,554 | Sabel | Aug. 5, 1941 |
| 2,360,787 | Murphree et al. | Oct. 17, 1944 |
| 2,409,235 | Atwell | Oct. 15, 1946 |
| 2,414,276 | Sensel et al. | Jan. 14, 1947 |
| 2,451,879 | Scharmann | Oct. 19, 1948 |
| 2,458,870 | Ogorzaly | Jan. 11, 1949 |